(12) United States Patent
Wang et al.

(10) Patent No.: US 9,428,605 B2
(45) Date of Patent: Aug. 30, 2016

(54) ORGANIC-INORGANIC HYBRID MATERIAL COMPOSITIONS AND POLYMER COMPOSITES

(71) Applicants: Zhikai Wang, Roswell, GA (US); John Jun Chiao, Marietta, GA (US)

(72) Inventors: Zhikai Wang, Roswell, GA (US); John Jun Chiao, Marietta, GA (US)

(73) Assignee: NEO SITECH LLC, Wilmington, DE (US)

( * ) Notice: Subject to any disclaimer, the term of this patent is extended or adjusted under 35 U.S.C. 154(b) by 109 days.

(21) Appl. No.: 14/075,945

(22) Filed: Nov. 8, 2013

(65) Prior Publication Data

US 2014/0128495 A1     May 8, 2014

Related U.S. Application Data

(60) Provisional application No. 61/723,908, filed on Nov. 8, 2012.

(51) Int. Cl.
*C08G 59/00* (2006.01)
*C09D 4/00* (2006.01)
*C08F 222/10* (2006.01)

(52) U.S. Cl.
CPC ............. *C08G 59/00* (2013.01); *C09D 4/00* (2013.01); *C08F 222/1006* (2013.01)

(58) Field of Classification Search
CPC ............ C07F 7/182; C07F 7/18; C09D 4/00; C08F 222/1006; C08G 59/00
USPC ...................................... 522/99, 84
See application file for complete search history.

(56) References Cited

U.S. PATENT DOCUMENTS

| | | | |
|---|---|---|---|
| 5,789,460 A * | 8/1998 | Harkness et al. | 522/148 |
| 6,517,984 B1 * | 2/2003 | Ferrar et al. | 430/58.2 |
| 7,638,195 B2 * | 12/2009 | Lichtenhan et al. | 428/405 |
| 8,026,293 B2 * | 9/2011 | Allen et al. | 522/99 |
| 2006/0052567 A1 * | 3/2006 | Saito et al. | 528/25 |
| 2007/0004932 A1 * | 1/2007 | Yamahiro et al. | 556/446 |
| 2010/0003493 A1 * | 1/2010 | Cheng et al. | 428/220 |
| 2010/0155989 A1 * | 6/2010 | Ishii et al. | 264/225 |
| 2011/0001190 A1 * | 1/2011 | Ide et al. | 257/347 |
| 2011/0160330 A1 * | 6/2011 | Nagai et al. | 522/167 |
| 2011/0196059 A1 * | 8/2011 | Nagai et al. | 522/172 |
| 2013/0237663 A1 * | 9/2013 | Tanaka et al. | 524/588 |

FOREIGN PATENT DOCUMENTS

| | | | |
|---|---|---|---|
| JP | 2007009080 A | * | 1/2007 |
| JP | 2011213821 A | * | 10/2011 |

OTHER PUBLICATIONS

Cheng et al. Synthesis and properties of silsesquioxane-based hybrid urethane acryalte applied to UV-curable flame-retardant coatings. Progess in Organic Coatings 65 (2009) 1-9. [online], [retrieved on Apr. 27, 2015]. Retreived from the Internet:<URL:http://www.elsevier.com/locate/porgcoat>.*

Mammeri et al. New Monofunctional POSS and Its Utilization as Dewetting Additives in Methacrylate Based Free-Standing Films. Chemistry of Materials 2009, 21, 4163-4171.*

* cited by examiner

*Primary Examiner* — Sanza McClendon

(57) ABSTRACT

A method for the preparation of an organic-inorganic hybrid composition is performed through three major steps. In addition, a product is generated from this organic-inorganic hybrid composition. In step one, a series of hydrolysis reactions and condensation reactions with a functional organosilane or a combination of functional organosilanes, in presence of water as a reactant for hydrolysis and a suitable acid or a base as a catalyst is performed in order to obtain the first intermediate. In step two, a hydroxyl group-capping intermediate is prepared via reacting a hydroxyl reactable chemical with a hydroxyl functional polymerizable compound. In the third step, a hydroxyl group-capping reaction is conducted with the first intermediate and the hydroxyl group-capping intermediate, so as to obtain the organic-inorganic hybrid composition. It may further include a polymerization step to form an organic-inorganic hybrid polymer composition by UV irradiation or other approaches.

25 Claims, No Drawings

ORGANIC-INORGANIC HYBRID MATERIAL COMPOSITIONS AND POLYMER COMPOSITES

The current application claims a priority to the U.S. Provisional Patent Application Ser. No. 61/723,908, filed on Nov. 8, 2012.

FIELD OF THE INVENTION

The present invention relates generally to polymerizable organic-inorganic hybrid compositions. More specifically, it relates to the polymerizable organic-inorganic hybrid compositions comprising the polymerizable silsesquioxane with one or more functional groups, which that are suitable for the applications demanding desirable scratch resistance, abrasion resistance, stain resistance, thermal stability, dimensional stability, flame retardancy, oxygen barrier and moisture barrier properties, dielectric constants, or high refractive index.

BACKGROUND OF THE INVENTION

Synthetic materials are an indispensable part of people's daily life. With a wide variety of products, from consumer goods to industrial equipments, from automotive parts to electronic devices, they have played important roles due to their wide range of properties. However, in many cases, a particular application may demand certain performance(s) that the synthetic materials alone, such as synthetic polymers, cannot offer. Yet the enhanced characteristics or performances can be achieved with certain composites, which are formed by combining synthetic resins with one or more components with significantly different physical or chemical properties. In a polymer composite, also frequently referred to as a polymer matrix composite (PMC), the polymer constitutes a continuous phase, while the other components are embedded in the phase to serve as fillers or reinforcements. The most widely used polymer resins include (un-saturated) polyesters, epoxy, phenolics, vinyl esters, polyurethanes, and polyimides. The common reinforcements are glass fibers, carbon fibers, aramid fibers and boron fibers. Sometimes fillers and reinforcements are modified through surface treatments so as to improve their wettability with polymer resins.

Moreover, the combination of organic and inorganic components at nanometer-scale or molecular level leads to a new category of composite materials termed organic-inorganic hybrid materials. Depending on interaction connecting organic and inorganic components, organic-inorganic hybrid materials are classified as either Class I materials in which the components interact weakly through hydrogen bonding, van der Waals force or electrostatic attraction, or Class II materials in which the organic and inorganic species are linked through stronger chemical bonding such as ionic or covalent bonds. Organic-inorganic hybrid materials were desired as specific mechanical, optical, thermal, electronic, magnetic, dielectric or other properties can be incorporated in the materials along with the inorganic or inorganic-like components.

Many inorganic components in organic-inorganic hybrid materials, especially certain silicon oxides, siloxanes and metal oxides, have been prepared through sol-gel technique. This widely used process starts with a colloidal solution (sol) of organosilanes, and/or metal alkoxides and/or metal salts, and undergoes a series of hydrolysis and condensation reactions, to yield gel-like integrated network as desirable for a particular application. The sol-gel process is a wet-chemical process that is catalyzed by either a base or an acid. Water is supplied as a reactant to participate in the hydrolysis reaction, and depending on the amount of water introduced; hydrolysis and condensation reactions can be reached at various levels. The outcome of the product composition, morphology and viscosity can be quite different as well. The chemistry, process, products and physics of sol-gel technique have been well documented in many academic books and scientific publications. However, several intrinsic issues limit the application scope of materials prepared by sol-gel process. The extents of the hydrolysis and condensation reactions are hard to control consistently, often giving rise to unrepeatable composition and viscosity. Aside from generating a large amount of organic solvents and alcohols, the sol-gel chemistry usually suffers low yields due to incomplete hydrolysis and condensation. In the firing process that follows the wet chemistry, high temperature is needed to drive out water. Water removal through capillary pressure can cause extremely high internal stress. Crack formation and stress evolution lead to defects in the fabricated products.

Of extensive interest as components in the organic-inorganic hybrid materials are the silsesquioxane compounds expressed by the general formula $(RSiO_{1.5})_n$. Structurally these silsesquioxanes can be random polymer networks, ladder polymers, incompletely condensed polyhedral frameworks, and fully condensed polyhedral cages, as often referred to as polyhedral oligosilsesquioxanes, or POSS. A convenient denotation T is adapted to represent silicon atom with three siloxane oxygen atoms attached to it. Although smaller POSS compounds such as $T_4$ and $T_6$ species were synthesized, the preparation was not easy and usually led to larger structures. On the other hand, larger POSS compounds such as $T_{10}$ and $T_{12}$ were made, but they are rare and are usually synthesized in low yield. The eight-silicon structure $T_8$ species have received most attention. They are relatively easy in their syntheses and the symmetrical cage structure brings a number of desirable properties including chemical stability, thermal stability, dimensional stability, abrasion resistance and viscoelastic properties.

POSS compounds can be synthesized by hydrolysis and condensation from trifunctional precursors $RSiX_3$, where R is either a hydrogen atom or a hydrocarbon group, sometimes bearing certain functionality that can be utilized for further reactions in an intended application, and X is a hydrolysable moiety, such as a chlorine atom, an alkoxyl group, or a silanol group. Other than coming directly from its precursors, substitute groups on POSS compounds may be "attached" by functionalization reactions as well. In order to achieve certain enhanced properties, metal atoms were brought into POSS structure as doping agent. For example, titanium atoms were included to partially replace some silicon atoms. The new material with titanium atoms as dopant showed improved refractive index for optical applications. In an organic-inorganic hybrid material composition, POSS compounds can be linked to the organic medium by pendant reactive functional groups such as (meth)acrylate, epoxy, thiol-ene, styryl, oxetane, cinnamate, etc. Though POSS compounds exhibit many unique properties, their syntheses are quite difficult, time consuming and of low yields, and thus their applications are significantly limited by these drawbacks.

In view of the above, it would be desirable to provide a method for well-controlled, repeatable, fast and high-yield preparation of organic-inorganic hybrid material compositions, which can lead to polymer composites with certain properties such as desirable scratch resistance, abrasion resistance, stain resistance, thermal stability, dimensional stability, flame retardancy, oxygen barrier and moisture barrier properties, dielectric constants, or high refractive index.

SUMMARY OF THE INVENTION

One objective of the present invention is to provide a method for the preparation of organic-inorganic hybrid materials fully or partially containing reactive groups that are polymerizable by free radical, cationic, thermo, photo or electron beam polymerization, preferably photo or electron beam polymerization.

Another objective of the present invention is to provide a method for the preparation of organic-inorganic hybrid materials fully or partially containing functional groups that provide desired physical, and/or electric, and/or optical and/or mechanical properties such as hydrophobic, hydrophilic properties, dielectric properties, flexibility, toughness, surface hardness, high refractive index, etc.

A further objective of the present invention is to provide polymerizable organic-inorganic hybrid materials which are comprised of polymerizable silsesquioxane (meth)acrylate derivatives, radiation curable (meth)acrylates, and other additives.

Another objective of the present invention is to provide polymerizable organic-inorganic hybrid materials which are comprised of polymerizable silsesquioxane thiol-ene derivatives, corresponding curable oligomers and monomers, and other additives.

Still another objective of the present invention is to provide polymerizable organic-inorganic hybrid materials which are comprised of polymerizable silsesquioxane epoxy derivatives, corresponding curable oligomers and monomers, and other additives.

Yet another objective of the present invention is to provide polymerizable organic-inorganic hybrid materials which are comprised of polymerizable silsesquioxane cinnamate derivatives, corresponding curable oligomers and monomers, and other additives.

Another objective of the present invention is to provide a polymer composite system by thermo, cationic, anionic, ultraviolet (UV) light or electron beam (EB) initiated polymerization.

Still another objective of the present invention is to provide a polymer composite system having desirable scratch resistance, abrasion resistance, stain resistance, thermal stability, dimensional stability, flame retardancy, oxygen barrier properties, moisture barrier properties, high and/or low dielectric constants, or high refractive index.

Yet another objective of the present invention is to provide a polymer composite system, due to the desirable properties described above, that are suitable for applications in protective coatings, flame retardant materials, food and pharmaceutical packaging films, electronic devices, and optical devices.

DETAIL DESCRIPTIONS OF THE INVENTION

All illustrations of the drawings are for the purpose of describing selected versions of the present invention and are not intended to limit the scope of the present invention.

The present invention provides a method for and a product of well-controlled, repeatable, fast and high-yield preparation of polymerizable organic-inorganic hybrid material compositions by three chemical reaction stages:

a) The first stage involves the hydrolysis and condensation of a functional organosilane, with a structure of $R_nSiX_{4-n}$, where R is desirable functional group for further polymerization reaction or to offer certain material properties (hydrophobic, hydrophilic, mechanical, optical, electrical, dielectric, magnetic, etc.), X is hydrolysable functional group, n=0, 1, 2, or 3, or a combination of different functional organosilanes, and/or metal alkoxides, and/or metal halides.

The functional organosilanes undergo a series of hydrolysis and condensation reactions in presence of water as a reactant for hydrolysis and an acid or a base as reaction catalyst. Depending on reaction conditions such as type of functional organosilanes, amount of water, type of catalyst, reaction temperature, reaction time, etc., the reaction products can be random polymer networks, ladder polymers, incompletely condensed polyhedral frameworks, and fully condensed polyhedral cages, as often referred to as polyhedral oligosilsesquioxanes, or POSS ($T_8$, $T_{10}$, $T_{12}$, etc.) Sometimes metal alkoxides and/or metal chloride/bromide were charged to the reaction mixture as metal doping to achieve certain desirable properties in the resulting products. In pursuit of $T_8$ structure, excess amount of water was supplied to the hydrolysis and condensation reactions. The reactions have been carried out in long hours, even for days. The post-reaction purification has been cumbersome and in low yield in order to get $T_8$ derivatives with high purity.

In the present invention, the amount of water supplied to the hydrolysis and condensation reactions of a functional organosilane, or a combination of functional organosilane, is strictly controlled relative to the amount of the functional organosilane. One or more metal alkoxides and/or metal chloride/bromide and/or other metal salts as exemplified below may be charged to the reaction mixture as metal doping to achieve certain desirable properties in the resulting compositions or composite systems. The molar ratio of the sum of silicon atoms from all functional organosilane(s), and metal atoms from all metal alkoxides(s), metal chloride(s), metal bromide(s), and metal acetate(s) where applicable, over water is between 1.0:1.0 and 1.0:6.5, or preferably between 1.0:1.0 and 1.0:4.0. The amount of metal alkoxides and/or metal chloride/bromide as doping agent is at the metal to silicon atom ratio between 1.0:49.0 to 49.0:1.0, and preferably between 1.0:19.0 to 19.0:1.0

Functional organosilanes suitable for use in this stage include, but are not limited to, tetraethoxysilane, methyltrimethoxysilane, methyltriethoxysilane, dimethyldimethoxysilane, propyltrimethoxysilane, propyltriethoxysilane, iso-butyltrimethoxysilane, iso-butyltriethoxysilane, phenyltrimethoxysilane, n-octyltriethoxysilane, methacryloxypropyltrimethoxysilane, chloropropyltriethoxysilane, methyldimethoxysilane, phenyltriethoxysilane, chloropropyltrimethoxysilane, aminoethylaminopropyltrimethoxysilane, glycidoxypropyltrimethoxysilane, vinyltriethoxysilane, tetraethoxysilane, (3-acetamidopropyl)trimethoxysilane, acetoxyethyldimethylchlorosilane, acetoxyethylmethyldichlorosilane, acetoxyethyltrichlorosilane, acetoxyethyltriethoxysilane, acetoxyethyltrimethoxysilane, acetoxyethyltris(dimethylamino)silane, acryloxymethyltrimethysilane, allyltrichlorosilane, allyltriethoxysilane, allyltri-iso-propylsilane, allyldimethylchlorosilane, allylmethyldichlorosilane, allylmethyldimethoxysilane, allyltrimethoxysilane, allylphenyldichlorosilane, 3-acrylamidopropyltris(trimethylsiloxy)silane.

Examples of the acid catalysts suitable for use in this stage include, but are not limited to, hydrochloric acid, hydrobromic acid, sulfuric acid, phosphoric acid, perchloric acid. The base catalysts suitable for use in this stage include, but are not limited to, sodium hydroxide, potassium hydroxide, barium hydroxide, cesium hydroxide, strontium hydroxide, calcium hydroxide, lithium hydroxide, rubidium hydroxide.

Examples of the metal alkoxides, metal halides or certain metal salts that can be used as doping agents in the silsesquioxane structure include, but are not limited to, aluminum n-butoxide, aluminum s-butoxide, aluminum t-butoxide, aluminum ethoxide, aluminum ethoxyethoxyethoxide, aluminum i-propoxide, aluminum magnesium i-propoxide, dimethylaluminum chloride, triethyl(tri-s-butoxy) dialuminum, tri-i-butyl aluminum, di-s-butoxyaluminoxytriethoxysilane (CAS#68959-06-8), antimony (III) n-butoxide, antimony (III) ethoxide, arsenic triethoxide, barium isopropoxide, barium (II) methoxypropoxide, barium titanium alkoxides, barium yttrium alkoxides, bismuth (III) t-pentoxide, boron allyloxide, boron n-butoxide, boron t-butoxide, born ethoxide, boron i-propoxide, boron methoxymethoxide, boron n-propoxide, boron vinyldimethylsiloxide, dimethylcadmium, cadmium iodide, calcium ethoxide, calcium methoxide, calcium methoxyethoxide, cecium methoxide, chromium (III) i-propoxide, cobalt n-butoxide, cobalt methoxide, cobalt t-butoxide, cobalt i-propoxide, cobalt n-propoxide, copper (II) dimethylaminoethoxide, copper (II) ethoxide, copper (II) methoxide, copper (II) methoxyethoxyethoxide, diethylgallium chloride, gallium (III) ethoxide, gallium trichloride, gallium tribromide, gallium triiodide, allyltrichlorogermane, allyltriethylgermane, allyltrimethylgermane, benzyltrichlorogermane, bis(chloromethyl)dimethylgermane, bromomethyltribormogermane, t-butyldimethylchlorogermane, t-butylgermane, n-butyltrichlorogermane, t-butyltrichlorogermane, carboxyehtylgermanium sesquioxide, carboxyethyltrichlorogermane, chloromethyltrimethylgermane, 3-chloropropyltrichlorogermane, cyclopentadienyltrimethylgermane, di-n-butyldichlorogermane, di-n-butylgermane, dichloromethyltrimethylgermane, diethyldichlorogermane, diethyldiethoxygermane, diethylgermane, dimethyldichlorogermane, diphenyldichlorogermane, diphenyldimethylgermane, diphenylgermane, ethyltrichlorogermane, ethyltriethoxygermane, germane tetrachloride, hexaethyldigermane, hexaethyldigermoxane, hexamethyldigermane, hexaphenyldigermane, hexaphenyldigermoxane, methylgermane, methyltrichlorogermane, methyltriethoxygermane, phenyltrichlorogermane, phenyldimethylchlorogermane, phenyltrimethylgermane, tetraallylgermane, tetra-n-butoxygermane, tetra-n-butylgermane, tetramethoxygermane, tetramethylgermane, tetrapentylgermane, tetraphenylgermane, tetra-n-propylgermane, tri-n-butylbromogermane, tri-n-butylchlorogermane, tri-n-butylgermane, trichlorogermane, triethylbromogermane, triethylchlorogermane, triethylgermane, triethylmethoxygermane, trifluoromethyltriiodogermane, trimethylbromogermane, trimethylchlorogermane, trimethylgermane, trimethyliodogermane, triphenylbromogermane, triphenylchlorogermane, triphenylgermane, tris(trifluoromethyl)iodogermane, tris(trimethylsilyl)germane, vinyltrichlorogermane, vinyltriethylgermane, germanium tetrabromide, germanium tetrachloride, Germanium tetraiodide, hafnium n-butoxide, hafnium t-butoxide, hafnium ethoxide, hafnium 2-ethylhexoxide tetraoctylhafnate, hafnocene dichloride, pentamethylcyclopentadienylhafnium trichloride, hafnium tetraiodide, dimethylindium chloride, trimethylindium, indium methoxyethoxide, iron (III) ethoxide, iron (III) i-propoxide, iron (III) n-propoxide, iron (III) i-butoxide, iron (III) n-butoxide, iron (III) s-butoxide, tetra-n-butyllead, tetraphenyllead, lead (II) chloride, magnesium ethoxide, magnesium methoxide, magnesium n-propoxide, molybdenum (V) ethoxide, niobium (V) n-butoxide, niobium (V) ethoxide, cerium (IV) t-butoxide, cerium (IV) i-propoxide, cerium (IV) ethylthioethoxide, cerium (IV) methoxyethoxide, erbium methoxyethoxide, lanthanum i-propoxide, lanthanum methoxyethoxide, neodymium methoxyethoxide, praseodymium methoxyethoxide, samarium (III) i-propoxide, yttrium i-propoxide, yttrium methoxyethoxide, tantalum (V) n-butoxide, tantalum (V) ethoxide, tantalum (V) methoxide, tantalum tetraethoxide dimethylaminoethoxide, tantalum (V) trifluoroethoxide, tantalum pentabromide, tellurium (IV) ethoxide, thallium (I) ethoxide, acryloxytri-n-butyltin, acryloxytriphenyltin, allyltri-n-butyltin, allyltrimethyltin, allyltrimethyltin, o-allyloxy(polyethyleneoxy)-tri-i-propoxytitanate, methyltitanium tri-i-propoxide, titanium bis(triethanolamine)-di-i-propoxide, titanium n-butoxide, titanium chloride tri-i-propoxide, titanium dichloride diethoxide, titanium ethoxide, titanium 2-ethylhexoxide, titanium iodide tri-i-propoxide, titanium i-butoxide, titanium i-propoxide, titanium methacrylate tri-i-propoxide, (2-methacryloxyethoxy)-tri-i-propoxytitanate, titanium methoxide, titanium methoxypropoxide, titanium n-nonyloxide, titanium n-propoxide, titanium stearyloxide, titanium tetrakis(bis 2,2-(allyloxymethyl)butoxide), titanium tri-i-propoxide tri-n-butylstannoxide, titanium tri-i-stearoyl-i-propoxide, titanium trimethacrylate methoxyethoxyethoxide, titanium trimethylsiloxide, titanium tris(dioctylphosphato)-i-propoxide, poly(dibutyltitanate), poly(octyleneglycol-titanate), titanium tetrabromide, titanium tetrachloride, titanium tetraiodide, tungsten (V) ethoxide, tungsten (VI) ethoxide, tungsten (VI) phenoxide, vanadium tri-i-butoxide oxide, vanadium tri-i-propoxide oxide, vanadium tri-n-propoxide oxide, zinc N,N-dimethylaminoethoxide, zinc methoxyethoxide, zirconium n-butoxide, zirconium t-butoxide, zirconium ethoxide, zirconium i-propoxide, zirconium 2-methyl-2-butoxide, zirconium n-propoxide, titanium acetate, zirconium acetate, titanium propionate, zirconium propionate, potassium titanium oxalate.

The reaction product from the above process is a mixture of random polymer networks, ladder polymers, incompletely condensed polyhedral frameworks, and fully condensed polyhedral cage derivatives with core structures of $T_8$, $T_{10}$, $T_{12}$, etc. The composition analysis indicated that the majority of the product mixture (over 50%) is $T_8$ derivatives, with other silsesquioxane structures account for the remainder of the components. The product components all have silsesquioxane structures that are suitable for the use in the present invention and no further purification is needed. Therefore, the method offers a well-controlled, repeatable, fast and high-yield preparation of polymerizable organic-inorganic hybrid material compositions.

As a result of the strict control of the amount water for the hydrolysis and condensation reactions of functional organosilane(s), and metal doping agents, the product mixture contains a small amount of hydroxyl groups. These hydroxyl groups offer sites for further capping reaction from which polymerizable functional groups such as (meth)acrylate, alkylene, arylalkylene, alkyne, cycloalkylene, cycloalkenylene, acyclic alkyl epoxide, cycloalkyl epoxide, mercaptam, cinnamate, may be introduced.

The reaction product from Stage a) is referred to as Inorganic Part.

b) The second stage involves the preparation of hydroxyl group-capping intermediates which may contain polymerizable functional groups such as (meth)acrylate, alkylene, arylalkylene, alkyne, cycloalkylene, cycloalkenylene, acyclic alkyl epoxide, cycloalkyl epoxide, mercaptam, cinnamate.

Various chemicals are known to react with hydroxyl groups at a fast rate under a mild reaction condition. Examples of such chemicals include, but are not limited to, isocyanate, acyl halide, etc.

In the present invention, hydroxyl group-capping isocyanate intermediates can be prepared by reacting hydroxyl functional polymerizable unsaturated compounds with multifunctional isocyanates in presence of a reaction catalyst. Typically one hydroxyl group reacts with one isocyanate group to yield a carbamate (urethane) structure. In order to provide isocyanate groups as intermediates for hydroxyl group-capping with product mixture from Stage a), isocyanate groups are charged in excess.

To introduce polymerizable functional (meth)acrylate or vinyl groups, a number of hydroxyl functional polymerizable unsaturated compounds can be used to react with a number of diisocyanates. The hydroxyl functional polymerizable unsaturated compounds include, but are not limited to, 2-hydroxyethyl acrylate (HEA), 2-hydroxyethyl methacrylate (HEMA), 2-hydroxypropyl(meth)acrylate, 3-hydroxypropyl(meth)acrylate, 2-hydroxybutyl(meth)acrylate, 4-hydroxybutyl(meth)acrylate, 3-hydroxypentyl(meth)acrylate, 6-hydroxynonyl(meth)acrylate, 2-hydroxypentyl(meth) acrylate, 5-hydroxypentyl(meth)acrylate, 7-hydroxyheptyl (meth)acrylate, 5-hydroxydecyl(meth)acrylate. Additionally, the hydroxy alkyl(meth)acrylates may be alkoxylated to varying degrees. Examples include diethylene glycol mono(meth)acrylate, polyethylene glycol mono (meth)acrylate, propylene glycol mono(meth)acrylate, polypropylene glycol mono(meth)acrylate, and (meth)acrylates combining ethoxylation and propoxylation, such as are available from LaPorte Performance Chemicals UK, LTD. Another class of suitable hydroxyalkyl acrylates includes lactone-hydroxyl acrylate adducts such as the caprolactone-2-hydroxyethyl acrylate adduct supplied by the Dow Chemical Company under the trade name of TONE M-100. Mixtures of the above hydroxyalkyl acrylates may also be used. Additionally, the hydroxy functionality may be incorporated in the form of a hydroxyl functional vinyl ether such as hydroxy butyl vinyl ether, hydroxy functional styrenic compounds, etc. Hydroxyl functionality may also be incorporated by using allyl alcohol and similar allylic monomers such as alkoxylated allyl alcohols which are hydroxy functional polymerizable unsaturated compounds which serve as both co-monomers and as radical chain transfer agents.

A number of difunctional isocyanates (diisocyanates) can be used in the reaction. Examples of suitable diisocyanate compounds include, but are not limited to, 3-isocyanatomethyl-3,5,5-trimethylcyclohexylisocyanate (isophorone diisocyanate or IPDI), 2,4-toluene diisocyanate and 2,6-toluene diisocyanate as well as mixtures of these diisocyanates (TDI), 4,4'-diphenylmethane diisocyanate (MDI), 2,4'-diphenylmethane diisocyanate, 4,4'-dicyclohexyldiisocyanate (or reduced MDI—also known as dicyclohexanemethane diisocyanate), meta- and para-tetramethyl xylene diisocyanate (TXMDI), hydrogenated meta-tetramethyl xylene diisocyanate[1,3-bis(isocyanatemethyl)cyclohexane], hexamethylene diisocyanate (HDI), norbornane diisocyanate (NBDI), 2,2,4- and 2,4,4-trimethylenehexamethylene diisocyanate (TMDI), 1,5-naphthylene diisocyanate (NDI), dianisidine diisocyanate, di(2-isocyanatoethyl)bicyclo [2.2.1]-hept-5-ene-2,3-dicarboxy late, 2,4-bromotoluene diisocyanate, 2,6-bromotoluene diisocyanate, 2,4-/2,6-bromotoluene diisocyanate, 4-bromo-meta-phenylene diisocyanate, 4,6-dibromo-meta-phenylene diisocyanate, and the like, including mixtures thereof. In addition, isocyanate functional biurets, allophonates, and isocyanurates of the previously listed isocyanates, as known to the art, may be used. Preferred diisocyanates are 3-isocyanatomethyl-3,5,5-trimethylcyclohexylisocyanate, hexamethylene diisocyanates, 2,4-toluene diisocyanate and 2,6-toluene diisocyanate as well as mixtures of these diisocyanates.

Certain amine and organometallic compounds are commonly used as urethane catalysts. Examples of urethane catalysts include, but are not limited to, triethylenediamine (TEDA, also known as 1,4-diazabicyclo[2.2.2]octane or DABCO, an Air Products's trade mark), dimethylcyclohexylamine (DMCHA), dimethylethanolamine (DMEA), tetramethylbutanediamine (TMBDA), pentamethyldipropylenetriamine, N-(3-dimethylaminopropyl)-N,N-diisopropanolamine, dibutyltin dilaurate, bismuth octanoate, phenylmercuric neodeconate.

The hydroxyl group-capping isocyanate intermediates may be prepared by further charging chain extenders, also known as difunctional polyols, to the reaction mixture of hydroxyl functional polymerizable unsaturated compounds and difunctional isocyanates, where isocyanate groups are in excess. The overall ratio of hydroxyl groups and isocyanate groups should be such that a slight isocyanate group excess exist in the final intermediates from this stage. Examples of difunctional polyols include, but are not limited to, 1,4-butanediol, 1,6-hexanediol, polyethylene glycol with molecular weight from 200 to 100,000, polypropylene glycol with molecular weight from 200 to 100,000, polycaprolactone-diol with molecular weight from 200 to 100,000.

Examples of acyl halides used for hydroxyl group-capping reaction include, but are not limited to, acetyl chloride, acetyl bromide, trifluoroacetyl chloride, 2-chloroacetyl chloride, 2,4,5-trifluoro-3-methoxybenzoyl chloride, 3,3,3-trifluoro-2-methoxy-2-phenylpropanoyl chloride, 4-fluorobenzoyl chloride, 3 fluorobenzoyl chloride, 2-fluorobenzoyl chloride, 2-chloro-6-fluorobenzene-1-carbonyl chloride, butanoyl chloride, pentanoyl chloride, 5-chloro-pentanoyl chloride, 4,4,4-trifluorobutanoyl chloride, 3,4,4-trifluorobutanoyl chloride, 2,3,4-trifluorobutanoyl chloride, 2-bromo-4,4,4-trifluorobutanoyl chloride, 3,4,4-trifluoro3-butenoyl chloride, 4-pentenoyl chloride, 5-hexanoyl chloride.

The reaction product from Stage b) is referred to as Organic Part.

c) The third stage involves the hydroxyl group-capping reaction between reaction products from Stage a) (Inorganic Part) and reactive intermediates from Stage b) (Organic Part).

A small amount of hydroxyl groups exist in Inorganic Part. These groups offer reaction sites to introduce other polymerizable groups by hydroxyl group-capping reactions with isocyanate groups on Organic Part from Stage b). Such reaction can be monitored to make sure all residual isocyanate groups are consumed in the process. Generally, the ratio of Inorganic Part to Organic Part by weight in Stage c) reactions is between 95:5 to 60:40, and preferably between 90:10 to 70:30.

The products from Stage c) are organic-inorganic hybrid material compositions with reactive functional groups and/ or other desired functional groups coming either from organic functional silanes, or capping reactions. The reactive groups include, but are not limited to, (meth)acrylate, alkylene, arylalkylene, alkyne, cycloalkylene, cycloalkenylene, acyclic alkyl epoxide, cycloalkyl epoxide, mercaptam, cinnamate.

Radiation curable compositions can be formulated by combining (meth)acrylate organic-inorganic hybrid material compositions from Stage c), one or more radiation curable (meth)acrylate monomers and oligomers, one or more photoinitiators, and are polymerized by ultraviolet (UV) light irradiation to produce organic-inorganic hybrid polymer composites.

A variety of monomers and oligomers which are mono or poly-esters of acrylic acid or methacrylic acid may be used in accordance with this invention and comprise about 5 to about 99 percent of the composition. While the polymerizable silsesquioxane derivatives would be about 1% to 100% by weight of the composition. These monomers and oligomers include, but are not limited to, tetrahydrofurfuryl methacrylate; tridecyl acrylate; tridecyl methacrylate; i-decyl methacrylate; 2(2-ethoxyethoxy) ethylacrylate; stearyl acrylate; tetrahydrofuryl acrylate; lauryl methacrylate; stearyl methacrylate; lauryl acrylate; 2-phenoxyethyl acrylate; 2-phenoxyethyl methacrylate; glycidyl methacrylate; i-decyl acrylate; i-bornyl methacrylate; iso-octyl acrylate; caprolactone acrylate; ethoxylated nonyl phenol acrylate; decyl acrylate; octyl methacrylate; iso-bornyl acrylate; propoxylated allyl methacrylate; methoxy polyethylene glycol monomethacrylate; polypropylene glycol monomethacrylate; ethoxylated nonyl phenol methacrylate; beta-carboxyethyl acrylate; beta-carboxyethyl methacrylate; octyl acrylate; decyl methacrylate; ethoxylated alkylphenol acrylate; ethoxylated alkylphenol methacrylate; Ebecryl™ 111, an epoxy monoacrylate supplied by Cytec Industries Inc.; Ebecryl™ CL1039 a urethane monoacrylate supplied by Cytec Industries Inc.; hexadecyl acrylate; hexadecyl methacrylate; behenyl acrylate; behenyl methacrylate; nonyl phenol propoxylate monoacrylate, nonyl phenol propoxylate monomethacrylate; polyethylene glycol dimethacrylate; polyethylene glycol diacrylate; tetraethylene glycol diacrylate; triethylene glycol diacrylate; tripropylene glycol diacrylate; 1,3 butylene glycol dimethacrylate; ethoxylated bis-phenol A dimethacrylate; ethoxylated bis-phenol A diacrylate; cyclohexane dimethanol diacrylate; cyclohexane dimethanol dimethacrylate; polypropylene glycol diacrylate; polypropylene glycol dimethacrylate; polyethylene glycol diacrylate; polyethylene glycol dimethacrylate; 1,6-hexane diol diacrylate; 1,6-hexane diol dimethacrylate; propoxylated neo-pentyl glycol diacrylate; propoxylated neo-pentyl glycol dimethacrylate; ethoxylated neo-pentyl glycol diacrylate; ethoxylated neo-pentyl glycol dimethacrylate; SR 9209, alkoxylated aliphatic diacrylate supplied by the Sartomer division of Total; dipropylene glycol diacrylate; dipropylene glycol dimethacrylate; tripropylene glycol dimethacrylate; Ebecryl™ 150, a bis-phenol A derivative diacrylate supplied by Cytec Industries Inc.; trimethylolpropane trimethacrylate; trimethylolpropane triacrylate; tris-(2-hydroxy ethyl) isocyanurate triacrylate; tris-(2-hydroxy ethyl) isocyanurate trimethacrylate; ethoxylated trimethylolpropane triacrylate; propoxylated trimethylolpropane triacrylate; ethoxylated trimethylolpropane trimethacrylate; propoxylated trimethylolpropane trimethacrylate; pentaerythritol triacrylate; pentaerythritol trimethacrylate; propoxylated glyceryl triacrylate; propoxylated glyceryl trimethacrylate; ethoxylated glyceryl triacrylate; ethoxylated glyceryl trimethacrylate; pentaerythritol tetraacrylate; di-trimethylolpropane tetraacrylate; dipentaerythritol pentaacrylate; ethoxylated pentaerythritol tetraacrylate; SR 9041, a pentaacrylate ester supplied by the Sartomer division of Total; SR 9008, an alkoxylated trifunctional acrylate ester supplied by the Sartomer division of Total; CD 9009, a trifunctional methacrylate ester supplied by the Sartomer division of Total; SR 9012, a trifunctional acrylate ester supplied by the Sartomer division of Total; CD 9050, a monofunctional acid ester supplied by the Sartomer division of Total; CD 9051, a trifunctional acid ester supplied by the Sartomer division of Total; SR 802, an alkoxylated diacrylate supplied by the Sartomer division of Total; SR 500 trifunctional monomer supplied by the Sartomer division of Total; SR 515 trifunctional monomer supplied by the Sartomer division of Total; SR 516 difunctional monomer supplied by the Sartomer division of Total; SR 517 trifunctional monomer supplied by the Sartomer division of Total; SR 518 tetrafunctional monomer supplied by the Sartomer division of Total; SR 519 trifunctional monomer supplied by the Sartomer division of Total; SR521 difunctional monomer supplied by the Sartomer division of Total; SR63 3 metallic diacrylate supplied by the Sartomer division of Total; SR634 metallic dimethacrylate supplied by the Sartomer division of Total; SR 636 metallic diacrylate supplied by the Sartomer division of Total; SR 705 metallic diacrylate supplied by the Sartomer division of Total; SR 708, metallic dimethacrylate supplied by the Sartomer division of Total; SR 709, metallic monomethacrylate supplied by the Sartomer division of Total; CN 934, urethane acrylate supplied by the Sartomer division of Total; CN 945, trifunctional urethane acrylate supplied by the Sartomer division of Total; CN95 3, urethane acrylate supplied by the Sartomer division of Total; CN 961, urethane acrylate supplied by the Sartomer division of Total; CN 962, urethane acrylate supplied by the Sartomer division of Total; CN 963, urethane acrylate supplied by the Sartomer division of Total; CN 964, urethane acrylate supplied by the Sartomer division of Total; CN 965, urethane acrylate supplied by the Sartomer division of Total; CN 966, urethane acrylate supplied by the Sartomer division of Total; CN 980, urethane acrylate supplied by the Sartomer division of Total; CN 198, urethane acrylate supplied by the Sartomer division of Total; CN 982, urethane acrylate supplied by the Sartomer division of Total; CN 983, urethane acrylate supplied by the Sartomer division of Total; CN 984 urethane acrylate supplied by the Sartomer division of Total; CN 985, urethane acrylate supplied by the Sartomer division of Total; CN 986, urethane acrylate supplied by the Sartomer division of Total; CN 970, urethane acrylate supplied by the Sartomer division of Total; CN 971, urethane acrylate supplied by the Sartomer division of Total; CN 972, urethane acrylate supplied by the Sartomer division of Total; CN 973, urethane acrylate supplied by the Sartomer division of Total; CN 975, hexafunctional urethane acrylate supplied by the Sartomer division of Total; CN 977, urethane acrylate supplied by the Sartomer division of Total; CN 978, urethane acrylate supplied by the Sartomer division of Total; CN 1 963, urethane methacrylate supplied by the Sartomer division of Total; CN 104, epoxy acrylate supplied by the Sartomer division of Total; CN 111, epoxidized soy bean oil acrylate supplied by the Sartomer division of Total; CN 112, epoxy Novolak acrylate supplied by the Sartomer division of Total; CN 115, modified epoxy acrylate supplied by the Sartomer division of Total; CN 117, modified epoxy acrylate supplied by the Sartomer division of Total; CN 118, acid modified epoxy acrylate supplied by the Sartomer division of Total; CN120 epoxy acrylate supplied by the Sartomer division of Total; CN 124, epoxy acrylate supplied by the Sartomer division of Total; CN 151, epoxy methacrylate supplied by the Sartomer division of Total; CN 130, aliphatic monoacrylate supplied by the Sartomer division of Total; CN 131, aromatic monoacrylate supplied by the Sartomer division of Total; CN 132, aliphatic diacrylate supplied by the Sartomer division of Total; CN 920, polyester acrylate supplied by the Sartomer division of Total; CN 704, acrylated polyester supplied by the Sartomer division of Total; CN 301, polybutadiene dimethacrylate supplied by the Sartomer division of Total; SB 400,401,402, 500,510, 520, aromatic acid methacrylate supplied by the Sartomer division of Total; Ebecryl™ 745, acrylated acrylic supplied by Cytec Industries Inc.; Ebecryl™ 754 acrylated acrylic supplied by Cytec Industries Inc.; Ebecryl™ 1701 acrylated acrylic supplied by Cytec Industries Inc.; Ebecryl™ 1710 acrylated acrylic supplied by Cytec Industries Inc.; Ebecryl™ 1755 acrylated acrylic supplied by Cytec Industries Inc.; Ebecryl™ 230 acrylated urethane supplied by Cytec Industries Inc.; Ebecryl™ 244, acrylated urethane supplied by Cytec Industries Inc.; Ebecryl™ 264 acrylated urethane supplied by Cytec Industries Inc.; Ebecryl™ 270 acrylated urethane supplied by Cytec Industries Inc.; Ebecryl™ 284 acrylated urethane supplied by Cytec Industries Inc.; Ebecryl™ 1290 acrylated urethane supplied by Cytec Industries Inc.; Ebecryl™ 2001 acrylated urethane supplied by Cytec Industries Inc.; Ebecryl™ 4830 acrylated urethane supplied by Cytec Industries Inc.; Ebecryl™ 4833 acrylated urethane supplied by Cytec Industries Inc.; Ebecryl™ 4835 acrylated urethane supplied by Cytec Industries Inc.; Ebecryl™ 4842 acrylated urethane supplied by Cytec Industries Inc.; Ebecryl™ 4866 acrylated urethane supplied by Cytec Industries Inc.; Ebecryl™ 4883 acrylated urethane supplied by Cytec Industries Inc.; Ebecryl™ 5129 acrylated urethane supplied by Cytec Industries Inc.; Ebecryl™ 8301 acrylated urethane supplied by Cytec Industries Inc.; Ebecryl™ 8402 acrylated urethane supplied by Cytec Industries Inc.; Ebecryl™ 8800 acrylated urethane supplied by Cytec Industries Inc.; Ebecryl™ 8803 acrylated urethane supplied by Cytec Industries Inc.; Ebecryl™ 8804 acrylated urethane supplied by Cytec Industries Inc.; Ebecryl™ 8807 acrylated urethane supplied by Cytec Industries Inc.; Ebecryl™ 3604 rubber modified epoxy acrylate supplied by Cytec Industries Inc.; Ebecryl™ 3605 acrylated bis-phenol A epoxy supplied by Cytec Industries Inc.; Ebecryl™ 3702 fatty acid modified epoxy acrylate supplied by Cytec Industries Inc.; Ebecryl™ 3703 amine modified bis-phenol A acrylate supplied by Cytec Industries Inc.; Ebecryl™ 3411 fatty acid modified epoxy acrylate supplied by Cytec Industries Inc.; Ebecryl™ 3600 amine modified bis-phenol A acrylate supplied by Cytec Industries Inc.; Ebecryl™ 168 methacylated acidic Monomer supplied by Cytec Industries Inc.; Ebecryl™ 170 acrylated acidic monomer supplied by Cytec Industries Inc.; Ebecryl™ 350 acrylated silicone supplied by Cytec Industries Inc.; Ebecryl™ 1360 silcone hexaacrylate supplied by Cytec Industries Inc.; Genomer™ 4188 urethane acrylate supplied by Rahn; Genomer™ 4205 urethane acrylate supplied by Rahn; Genomer™ 4215 urethane acrylate supplied by Rahn; Genomer™ 4246 urethane acrylate supplied by Rahn; Genomer™ 4269 urethane acrylate supplied by Rahn; Genomer™ 4297 urethane acrylate supplied by Rahn; Genomer™ 4302 urethane acrylate supplied by Rahn; Genomer™ 4312 urethane acrylate supplied by Rahn; Genomer™ 4316 urethane acrylate supplied by Rahn; Genomer™ 4510 urethane acrylate supplied by Rahn; Genomer™ 4661 urethane acrylate supplied by Rahn; Genomer™ 4205 urethane acrylate supplied by Rahn; Genomer™ 5248 urethane acrylate supplied by Rahn; Genomer™ 5275 urethane acrylate supplied by Rahn; Genomer™ 5695 urethane acrylate supplied by Rahn; Genomer™ 7154 urethane acrylate supplied by Rahn; Photomer® 5018, polyester acrylate supplied by Photomer Energy Curing Chemicals; Photomer® 5018, polyester acrylate supplied by Photomer Energy Curing Chemicals; RCC™ 13-429, polyester acrylate supplied by Photomer Energy Curing Chemicals; RCC™ 13-430, polyester acrylate supplied by Photomer Energy Curing Chemicals; RCC™ 13-432, polyester acrylate supplied by Photomer Energy Curing Chemicals; RCC™ 13-433, polyester acrylate supplied by Photomer Energy Curing Chemicals; Photomer® 6008, urethane acrylate supplied by Photomer Energy Curing Chemicals; Photomer® 6010, urethane acrylate supplied by Photomer Energy Curing Chemicals; Photomer® 6022, urethane acrylate supplied by Photomer Energy Curing Chemicals; Photomer® 6184, urethane acrylate supplied by Photomer Energy Curing Chemicals; Photomer® 6210, urethane acrylate supplied by Photomer Energy Curing Chemicals; Photomer® 6217, urethane acrylate supplied by Photomer Energy Curing Chemicals; Photomer® 6788-20R, urethane acrylate supplied by Photomer Energy Curing Chemicals; Photomer® 6893, urethane acrylate supplied by Photomer Energy Curing Chemicals; RCC™ 12-891, urethane acrylate supplied by Photomer Energy Curing Chemicals; RCC™ 12-892, urethane acrylate supplied by Photomer Energy Curing Chemicals; RCC™ 13-363, urethane acrylate supplied by Photomer Energy Curing Chemicals; Photomer® 6173, aromatic acrylate supplied by Photomer Energy Curing Chemicals; RCC™ 13-424, polyester acrylate supplied by Photomer Energy Curing Chemicals; Heinks 5205, urethane acrylate supplied by Heinks Science and Technology Development Company, Ltd.; Heinks 5303, urethane acrylate supplied by Heinks Science and Technology Development Company, Ltd.; Heinks 5315, urethane acrylate supplied by Heinks Science and Technology Development Company, Ltd.; Heinks 5317, urethane acrylate supplied by Heinks Science and Technology Development Company, Ltd.; Heinks 5351, urethane acrylate supplied by Heinks Science and Technology Development Company, Ltd.

The monomers and oligomers useful for the compositions of the present invention may have one or more alpha, beta ethylenically unsaturated functional groups. Monomers and oligomers having one, two, three, or four alpha, beta ethylenically unsaturated functional groups per molecule are well-known. It is generally understood that as the number of alpha, beta ethyleneically unsaturated functional groups are increased from one per molecule to more than one per molecule the number of branches and cross-links in the cured coating will increase. The degree of cross-linking can result in harder composites that may have improved solvent resistance or may demonstrate other desirable properties. However, this increase in hardness generally must be balanced by the result that the higher level of cross-linking may provide a less flexible film. In applications where high degrees of flexibility would be an important characteristic for the coating, a significant majority of the monomers and oligomers would be selected from a list of monofunctional and difunctional materials. In order to achieve the highest levels of flexibility, the monomers and oligomers would be selected exclusively from a list of monofunctional and difunctional monomers and oligomers with a significant majority being from a list of monofunctional monomers and oligomers.

It is well known in the art of UV-curable coatings that a suitable photoinitiator may be used in order to promote the polymerization of unsaturated monomers and oligomers. These photoinitiators may comprise about 0 to about 10 percent by weight of the coating composition and may be used singly, in combination, or with the addition of suitable synergists. Examples of photoinitiators that may be used in accordance with the present invention include, but are not limited to, benzil dimethyl ketal, trimethylbenzophenone, benzophenone, 1-hydroxycyclohexylphenyl ketone, 2-benzyl-2-(dimethylamino)-4'-morpholinobutyrophenone, 2,2-dimethoxy-2-phenylacetophenone, isopropylthioxanthone, hydroquinone, hydroquinone monomethyl ether, p-benzoquinone, 4-chlorobenzophenone, 4-hydroxy benzophenone, 4,4-bis-(N,N-dimethylamino)-benzophenone, thioxanthones, xanthones, acridine derivatives, quinoxaline derivatives and 1-phenyl-1,2-propanedione-2-o-benzoyl oxime, naphthaquinone, anthraquinone, 2-methylanthraquinone, 2-ethylanthraquinone, 2-tert-butylanthraquinone, 1-chloroanthraquinone, 2-chloroanthraquinone benzylidene, 2-amylanthraquinone, triphenylphosphine, phenyl-bis-(2,4,6-Trimethylbenzoyl)phosphine oxide, 2,4,4 trimethylpentyl-bis-(2',6'-dimethoxybenzoyl)phosphine oxide, acetophenone, 2,2-dimethoxyacetophenone, 1,1-dichloroacetophenone, propiophenone, cycicopropyl phenyl ketone, benzaldehyde, beta-naphylphenyl ketone, D,L-camphorquinone, beta-naphthaldehyde, beta-acetonaphthone, 2,3-pentanedione, fluorenone, benzanthrone, bis(parahydroxybenzylidene)acetone, benzoin, benzoin methyl ether, benzoin ethyl ether, benzoin iso-propyl ether, benzoin phenyl ether, benzoin acetate, deoxybenzoin, chlorodeoxybenzoin, 2,2-dimethyloxy-2-phenyl, 1,3,5-triacetyl benzene, 2,5-diethoxy stilbene, thioxanthone, anthracene, pyrene, picramide, nitronaphthalene, 5-nitroacenaphthalene, 2-nitrofluorene, rose Bengal, acridine orange, chlorophyllin, crystal violet, Eosin Y, fluorescein, flavin mononucleotide, hematoporphyrin, hemin, Malachite Green, methylene blue, Rhodamine B, chlorophyll, cosine, erthrosin, Methylene Green, Toluidine Blue, thionine, azidobenzene, p-phenyl bisazide, p-azidobenzophenone, 4,4'-diazidobenzophenone, 4,4'-diazidodiphenylmethane, 4,4 '-diazido-stilbene, 4,4'-diazidochalcone, 3,6-di(4'-azidobenzal)cyclohexanone, 2,6-di (4'-azidobenza 1)-4-methylcyclohexanone, p-diazodiphenylamineparaformaldehyde condensates, 1-diazo-4-dimethylaminobenzene hydro-fluoroborate, 1-diazo-3-methyl-4-dimethylaniline sulfate, 1,2-napthoquinonediazide, 2,3,4-trihydroxybenzophenone, bis-(naphthoquinone-1,2-diazido-5-sulfonate), 2-(naphthoquinone-1,2-diazido-5 sulfonyloxy)-3-hydroxynaphthalene, naphthoquinone-1,2-diasido-5-sulfonic acid novolak ester, naphthoquinone-1,2-diazido-5-sulfanilide, azidobenzoic acid, azidophthalic acid, benzene chromium tricabonyl, 2-methyl-4'-(methylthio)-2 morpholinopropiophenone.

The organic-inorganic hybrid material compositions may be polymerized by reacting epoxy groups. In such case, polymerizable compositions can be formulated by combining epoxy organic-inorganic hybrid material compositions from Stage c), one or more epoxy monomers and oligomers, one or more catalysts, and other additives.

With intentionally selected functional groups and components in the formulation, polymer composites with desirable scratch resistance, abrasion resistance, stain resistance, thermal stability, dimensional stability, flame retardancy, oxygen barrier properties, moisture barrier properties, dielectric constants, and/or high refractive index, can all be achieved, and can be used as protective coatings, flame retardant coatings, food and pharmaceutical packaging films, encapsulant materials for LED lighting devices or photovoltaic device, brightness enhancing films in LED display panels and computer screens, coatings and materials for fiber optics, light guide tubes, light switches, light management devices, optical sensors, optical devices, as well as in emersion lithography, etc.

The present invention is further illustrated by the following examples:

EXAMPLE 1

In a dry reaction flask equipped with a mechanical stirrer, a reflux condenser, and a pressure-equalizing dropping funnel, 150.00 g of KH-570 was charged and stirred. To this stirred liquid was added through the dropping funnel a homogeneous mixture of 111.1 g of ethanol, 8.40 g of distilled water, and 8.00 g of dilute aqueous hydrochloric acid (0.74% by weight) over a period of 5 minutes. The reaction mixture was further stirred at ambient temperature for 2 hours. The mixture was transferred to a dry round-bottom flask. The flask was placed onto a vacuum rotary evaporator with a heating bath to remove volatile components. The resulting product was labeled as SSQ.

EXAMPLES 2, 3, 4, 5, 6, 7

Titanium doping SSQ samples were prepared with accordance to the chemical amounts listed in Table 1. In a dry reaction flask equipped with a mechanical stirrer, a reflux condenser, and a pressure-equalizing dropping funnel, appropriate amounts of KH-570 and titanium tetrabutoxide were charged and stirred. To this stirred liquid was added through the dropping funnel a homogeneous mixture of ethanol distilled water, and dilute aqueous hydrochloric acid (0.74% by weight) over a period of 5 minutes. The reaction mixture was further stirred at ambient temperature for 2 hours. The mixture was transferred to a dry round-bottom flask. The flask was placed onto a vacuum rotary evaporator with a heating bath to remove volatile components. The resulting product was labeled as Ti-SSQ-OH.

TABLE 1

| Example | KH-570 (g) | Ti(OBu)$_4$ (g) | EtOH (g) | 0.74% (wt) aq. HCl (g) | H$_2$O (g) |
|---|---|---|---|---|---|
| EXAMPLE 2 | 112.50 | 51.39 | 111.10 | 8.00 | 8.40 |
| EXAMPLE 3 | 120.00 | 41.11 | 111.10 | 8.00 | 13.80 |
| EXAMPLE 4 | 120.00 | 41.11 | 111.10 | 8.00 | 8.40 |
| EXAMPLE 5 | 127.50 | 30.83 | 111.10 | 8.00 | 8.40 |
| EXAMPLE 6 | 135.00 | 20.56 | 111.10 | 8.00 | 8.40 |
| EXAMPLE 7 | 142.50 | 10.28 | 111.10 | 8.00 | 8.40 |

EXAMPLE 8

In a dry reaction flask equipped with a mechanical stirrer, a reflux condenser, and a pressure-equalizing dropping funnel, 0.0254 g of dibutyltin dilaurate (DBTDL) and 16.90 g of IPDI were charged and stirred to form a homogeneous liquid. To this stirred liquid was added through the dropping funnel a homogeneous mixture of 0.01 g of MeHQ and 8.709 g of 2-hydroxyethyl acrylate (HEA) slowly so that the reaction temperature did not exceed 70° C. The reaction mixture was further stirred between 65 to 70° C. kept by an electric heating mantle for 2 hours.

Then, to this stirred reaction mixture was added through a dry and clean dropping funnel a mixture of 0.128 g of DBTDL and 102.576 g of SSQ (as prepared in Examples 1 through 7 at a controlled rate so as for the reaction temperature not to exceed 70° C. After the addition, the reaction mixture was further stirred between 65 to 70° C. kept by an electric heating mantle for 4 hours. During the process, the residual isocyanate amount was monitored according to Chemical Industry Standard HG/T 2409-92 of the People's Republic of China. The resulting organic-inorganic hybrid material was allowed to cool to room temperature naturally.

EXAMPLE 9

A radiation curable organic-inorganic hybrid material formulation was prepared by using the product of EXAMPLE 8 (denoted as A-SSQ-Hybrid) and other components at various amounts as listed in the following table (Table 2):

TABLE 2

| Components | Weight (parts or g) | Weight (%) |
|---|---|---|
| A-SSQ-Hybrid | 100.0 | 25.0 |
| Ebecryl 1290 | 172.0 | 43.0 |
| Heinks 5317 | 46.0 | 11.5 |
| HDODA | 40.0 | 10.0 |
| TMPTA | 20.0 | 5.0 |
| KH 570 | 6.0 | 1.5 |
| Irgacure 184* | 16.0 | 4.0 |
| Total | 400.0 | 100.0 |

*A photoinitiator commercially available from CIBA Specialty Chemicals/BASF.

The mixture was mixed by stirring to form a homogeneous (by eyes) mixture at ambient temperature.

EXAMPLE 10

A coating of the mixed mixture from Example 9 was drawn down on steel panels and polished granite stone surface at a thickness of approximately 10 to 30 μm. The coated panels and granite were then cured in air under a mercury vapor electrodeless UV lamp (UV cure dosage was in the range of 300 mJ-800 mJ) to achieve tack-free cured coating surfaces consisting of an organic-inorganic hybrid polymer composite.

The cured coatings were tested by a number of standard and self-designed testing methods to evaluate their coating performance. The performance data of the composite in Table 3 indicates the composite exhibits many desirable performance properties.

TABLE 3

| Property | Test Method | Result |
|---|---|---|
| Appearance | Keshijia Gloss Machine (model WGG60-E4) | Surface gloss was 80-95 |
| Pencil Hardness | Chinese GB/T 6739-2006 | >9H |
| Scratch Resistance | Scratch back and forth by a steel wool with 1 kg load | No scratches with >2500 times |
| Micro-hardness | Chinese GB 5934-86 | Micro-hardness value was 37.84 |
| Impact Resistance | Drop a 67 g metal ball from a height of 80 cm to hit the surface | No coating damage |
| Acid Resistance | 5% sulfuric acid, 5 drops, >480 hours, natural drying | No evidence of erosion or discoloration |
| Base Resistance | 5% NaOH solution, 5 drops, >480 hours, natural drying | No evidence of erosion or discoloration |
| Burning resistance | Light a cigarette and leave it on the coating until burns out | No evidence of burn or discoloration |
| Salt water resistance | Soak the coating in saturated NaCl solution for 3 days | No evidence of any change or discoloration |
| Adhesion | Chinese GB/T 9286-1998 | All reached level 0 to level 1 |
| Temperature resistance | Age at 600 C. and 90% humidity for 2 days, then check adhesion according to Chinese GB/T 9286-1998 | All reached level 1-2 |

The above examples further illustrate the invention but, of course, should not be construed as in any way limiting its scope. It will be readily appreciated by those skilled in the art that modifications and variations may be made to the invention without departing from the concept, spirit or scope disclosed in the foregoing description. Such modifications and variations are to be considered as included within the following claims and equivalents, by their language, expressly state otherwise.

What is claimed is:

1. A method for preparation of an organic-inorganic hybrid composition, comprising
   performing hydrolysis reactions and condensation reactions with a functional organosilane or a combination of functional organosilanes, in presence of water as a reactant for hydrolysis and a suitable acid or base as a catalyst, wherein said step of performing hydrolysis reactions and condensation reactions further comprising adding a metal doping agent, wherein said metal doping agent being one or more selected from the group consisting of metal alkoxides, metal halides, titanium acetate, zirconium acetate, titanium propionate, zirconium propionate, and potassium titanium oxalate;
   obtaining a first intermediate, wherein the first intermediate comprises a plurality of hydroxyl groups, and the plurality of hydroxyl groups are selected from the group consisting of Si—OH, Ti—OH, Zr—OH and combinations thereof;
   preparing a hydroxyl group-capping intermediate;
   performing a hydroxyl group-capping reaction with the first intermediate and the hydroxyl group-capping intermediate;
   irradiating with an ultraviolet (UV) light or an electron-beam;
   polymerizing to form an organic-inorganic hybrid polymer composition;
   obtaining said organic-inorganic hybrid composition; and
   an atom ratio of metal atoms in said metal doping agent over silicon atoms in said functional organosilane or said combination of functional organosilanes being 1.0 :19.0 to 19.0:1.0.

2. The method for preparation of an organic-inorganic hybrid composition as set forth in claim 1, wherein
said functional organosilane or each member of said combination of functional organosilanes being represented by a chemical formula of $R_nSiX_{4-n}$;
R being a first functional group, or a combination of different functional groups;
X being a hydrolysable functional group;
n=0, 1, 2, or 3; and
Si being element silicon.

3. The method for preparation of an organic-inorganic hybrid composition as set forth in claim 1, wherein
said first intermediate being a mixture of the group consisting of polymer networks, ladder polymers, incompletely condensed polyhedral frameworks, and fully condensed polyhedral cages; and
said hydroxyl groups offering sites for said hydroxyl group-capping reaction.

4. The method for preparation of an organic-inorganic hybrid composition as set forth in claim 1, wherein
a molar ratio of a sum of said functional organosilane or said combination of functional organosilanes and said metal doping agent over said water being between 1.0:1.0 to 1.0:6.5.

5. The method for preparation of an organic-inorganic hybrid composition as set forth in claim 1, wherein
a molar ratio of a sum of said functional organosilane or said combination of functional organosilanes and said metal doping agent over said water being between 1.0:1.0 to 1.0:4.0.

6. The method for preparation of an organic-inorganic hybrid composition as set forth in claim 1, wherein
said hydroxyl group-capping intermediate being prepared by reacting a hydroxyl reactable chemical with a hydroxyl functional polymerizable compound;
said hydroxyl reactable chemical being one or more selected from the group consisting of isocyanate and acyl halide; and
said polymerizable functional groups being one or more selected from the group consisting of acrylate, methacrylate, alkylene, arylalkylene, alkyne, cycloalkylene, cycloalkenylene, acyclic alkyl epoxide, cycloalkyl epoxide, mercaptam and cinnamate.

7. An organic-inorganic hybrid composition, comprising
a polymerizable silsesquioxane-urethane derivative with one or more functional groups, wherein the polymerizable silsesquioxane-urethane derivative is linked by a bond in a form of -M-O—CO—N—, in which M is either silicon or a metal atom; and
said one or more functional groups being selected from the group consisting of acrylate, methacrylate, alkylene, arylalkylene, alkyne, cycloalkylene, cycloalkenylene, acyclic alkyl epoxide, cycloalkyl epoxide, mercaptam and cinnamate.

8. The organic-inorganic hybrid composition as set forth in claim 7, further comprising
one or more curable oligomers and monomers; and
one or more additives.

9. A method for preparation of an organic-inorganic hybrid composition, comprising
performing hydrolysis reactions and condensation reactions with a functional organosilane or a combination of functional organosilanes, in presence of water as a reactant for hydrolysis and a suitable acid or base as a catalyst;
said step of performing hydrolysis reactions and condensation reactions comprising obtaining a first intermediate, preparing a hydroxyl group-capping intermediate; performing a hydroxyl group-capping reaction with the first intermediate and the hydroxyl group-capping intermediate, and obtaining said organic-inorganic hybrid composition;
said step of performing hydrolysis reactions and condensation reactions further comprising adding a metal doping agent, wherein said metal doping agent being one or more selected from the group consisting of metal alkoxides, metal halides, titanium acetate, zirconium acetate, titanium propionate, zirconium propionate and potassium titanium oxalate;
said hydroxyl group-capping intermediate being prepared by reacting a hydroxyl reactable chemical with a hydroxyl functional polymerizable compound, and said first intermediate comprises a plurality of hydroxyl groups, and the plurality of hydroxyl groups are selected from the group consisting of Si—OH, Ti—OH, Zr—OH and combinations thereof;
said hydroxyl reactable chemical being one or more selected from the group consisting of isocyanate and acyl halide;
said polymerizable functional groups being one or more selected from the group consisting of acrylate, methacrylate, alkylene, arylalkylene, alkyne, cycloalkylene, cycloalkenylene, acyclic alkyl epoxide, cycloalkyl epoxide, mercaptam and cinnamate; and
an atom ratio of metal atoms in said metal doping agent over silicon atoms in said functional organosilane or said combination of functional organosilanes being 1.0:19.0 to 19.0:1.0.

10. The method for preparation of an organic-inorganic hybrid composition as set forth in claim 9, wherein
said functional organosilane or each member of said combination of functional organosilanes being represented by a chemical formula of $R_nSiX_{4-n}$;
R being a first functional group, or a combination of different functional groups;
X being a hydrolysable functional group;
n =0, 1, 2,or 3;
Si being element silicon;
said first intermediate being a mixture of the group consisting of polymer networks, ladder polymers, incompletely condensed polyhedral frameworks, and fully condensed polyhedral cages;
said first intermediate comprising either silicon hydroxyl groups or metal-linked hydroxyl groups; and
said hydroxyl groups offering sites for said hydroxyl group-capping reaction.

11. The method for preparation of an organic-inorganic hybrid composition as set forth in claim 9, wherein
a molar ratio of a sum of said functional organosilane or said combination of functional organosilanes and said metal doping agent over said water being between 1.0:1.0 to 1.0:6.5.

12. The method for preparation of an organic-inorganic hybrid composition as set forth in claim 9, wherein
a molar ratio of a sum of said functional organosilane or said combination of functional organosilanes and said metal doping agent over said water, being between 1.0:1.0 to 1.0:4.0.

13. The organic-inorganic hybrid composition as set forth in claim 7, wherein
said one or more functional groups being acrylate or methacrylate.

14. The organic-inorganic hybrid composition as set forth in claim 13, wherein
said polymerizable silsesquioxane-urethane derivative being 1% to 100% by weight of said organic-inorganic hybrid composition, wherein the polymerizable silsesquioxane-urethane derivative is linked by a bond in a form of -M-O—CO—N—, in which M is either silicon or a metal atom of either zirconium or titanium;
said acrylate or methacrylate being 5% to 99% by weight of said organic-inorganic hybrid composition; and
further comprising one or more photoinitiators in an amount of from 0% to 10% by weight of said organic-inorganic hybrid composition.

15. The organic-inorganic hybrid composition as set forth in claim 14, wherein
said organic-inorganic hybrid composition being polymerized induced by photon or electron beam.

16. The organic-inorganic hybrid composition as set forth in claim 8, wherein
said polymerizable silsesquioxane-urethane derivative being 1% to 100% by weight of said organic-inorganic hybrid composition;
said one or more functional groups being 5% to 99% by weight of said organic-inorganic hybrid composition; and
further comprising one or more free radical initiators in an amount of from 0% to 10% by weight of said organic-inorganic hybrid composition.

17. The organic-inorganic hybrid composition as set forth in claim 16, wherein said organic-inorganic hybrid composition being polymerized via free radical polymerization.

18. The organic-inorganic hybrid composition as set forth in claim 7, wherein
said one or more functional groups being acyclic alkyl epoxide or cycloalkyl epoxide.

19. The organic-inorganic hybrid composition as set forth in claim 18, wherein
said polymerizable silsesquioxane-urethane derivative being 1% to 100% by weight of said organic-inorganic hybrid composition, wherein the polymerizable silsesquioxane-urethane derivative is linked by a bond in a form of -M-O—CO—N—, in which M is either silicon or a metal atom of either zirconium or titanium;
said one or more functional groups being 5% to 99% by weight of said organic-inorganic hybrid composition; and
further comprising one or more cationic polymerization initiators in an amount of from 0% to 10% by weight of said organic-inorganic hybrid composition.

20. The organic-inorganic hybrid composition as set forth in claim 19, wherein
said organic-inorganic hybrid composition being polymerized via cationic polymerization.

21. The organic-inorganic hybrid composition as set forth in claim 7, wherein
said one or more functional groups being mercaptam.

22. The organic-inorganic hybrid composition as set forth in claim 21, wherein
said polymerizable silsesquioxane derivative being 1% to 100% by weight of said organic-inorganic hybrid composition;
a Thiol-Enes being 5% to 99% by weight of said organic-inorganic hybrid composition; and
further comprising one or more polymerization initiators being in an amount of from 0% to 10% by weight of said organic-inorganic hybrid composition.

23. The organic-inorganic hybrid composition as set forth in claim 22, wherein
said organic-inorganic hybrid composition being polymerized via said one or more functional groups.

24. The method for preparation of an organic-inorganic hybrid composition as set forth in claim 1, wherein
said first intermediate being a mixture of the group consisting of polymer networks, ladder polymers, incompletely condensed polyhedral frameworks, and fully condensed polyhedral cages;
said first intermediate comprising metal-linked hydroxyl groups; and
said metal linked hydroxyl groups offering sites for said hydroxyl group-capping reaction.

25. The organic-inorganic hybrid composition as set forth in claim 7, wherein the metal atom is either zirconium or titanium.

* * * * *